(12) United States Patent
Mikkelsen (10) Patent No.: US 12,485,726 B2
(45) Date of Patent: Dec. 2, 2025

(54) METHOD FOR REMEDIATING LOSS OF COOLANT FLOW OR AERATED COOLANT IN THERMAL MANAGEMENT OF DEVICES

(71) Applicant: GM GLOBAL TECHNOLOGY OPERATIONS LLC, Detroit, MI (US)

(72) Inventor: Karl Bo Albert Mikkelsen, Peachland (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 41 days.

(21) Appl. No.: 18/480,703

(22) Filed: Oct. 4, 2023

(65) Prior Publication Data
US 2025/0115095 A1    Apr. 10, 2025

(51) Int. Cl.
  *B60H 1/00*    (2006.01)
  *B60H 1/32*    (2006.01)

(52) U.S. Cl.
  CPC ....... *B60H 1/00978* (2013.01); *B60H 1/3225* (2013.01)

(58) Field of Classification Search
  CPC .............. B60H 1/00978; B60H 1/3225; B60H 2001/3239; B60H 2001/3242
  See application file for complete search history.

(56) References Cited

U.S. PATENT DOCUMENTS

| 12,202,317 | B1* | 1/2025 | Sawant | B60H 1/323 |
| 2007/0215073 | A1* | 9/2007 | Lawrence | F01P 11/028 |
| | | | | 123/41.54 |
| 2016/0067816 | A1* | 3/2016 | Nicewonger | F16K 31/16 |
| | | | | 137/565.01 |

FOREIGN PATENT DOCUMENTS

| DE | 102017111976 A1 | 12/2017 |
| DE | 102022106024 A1 | 12/2022 |

OTHER PUBLICATIONS

U.S. Appl. No. 18/328,883, filed Jun. 5, 2023—Vehicle Battery Coolng Systems, Gurhari Preet Singh.
U.S. Appl. No. 18/312,698, filed May 5, 2023—Secondary Cooling System for Control Modules, Gurhari Preet Singh.
U.S. Appl. No. 18/110,944, filed Feb. 17, 2023—Multimodal Cooling Systems Including Integrated Cooling Devices With Refrigerant-to-Coolant Heat Exchangers, Karl Bo Albert Mikkelsen.
U.S. Appl. No. 18/447,417, filed Aug. 10, 2023—Systems and Methods for Monitoring a Fluid Line in a Vehicle, Pulasti Bandara.

* cited by examiner

Primary Examiner — Marc E Norman
(74) Attorney, Agent, or Firm — Ingrassia Fisher & Lorenz, LLP | IF&L (57) ABSTRACT

In an embodiment, a method is provided for controlling thermal management of a device via a thermal system, the method including obtaining, via a flow sensor, flow data as to a flow of coolant of the thermal system; determining, via a processor, one or more characteristics of the flow of the coolant of the thermal system, based on the flow data; and adjusting control of the thermal system for the thermal management of the device, based on the one or more characteristics of the flow of the coolant of the thermal system, via instructions provided by the processor.

16 Claims, 4 Drawing Sheets

METHOD FOR REMEDIATING LOSS OF COOLANT FLOW OR AERATED COOLANT IN THERMAL MANAGEMENT OF DEVICES

INTRODUCTION

The technical field generally relates to thermal management of devices, such as computers in vehicles, and for remediating loss of coolant flow or aerated coolant for the thermal management.

Thermal management may be utilized for devices, including for safety critical devices such as computers for vehicles. However, existing techniques may not always provide for optimal thermal management, including with respect to loss of coolant flow, aerated coolant, or both.

Accordingly, it is desirable to provide improved methods and systems for thermal management of devices, including computers of vehicles, and including for the remediating of loss of coolant flow, aerated coolant, or both, for the thermal management of the devices. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided for controlling thermal management of a device via a thermal system, the method including obtaining, via a flow sensor, flow data as to a flow of coolant of the thermal system; determining, via a processor, one or more characteristics of the flow of the coolant of the thermal system, based on the flow data; and adjusting control of the thermal system for the thermal management of the device, based on the one or more characteristics of the flow of the coolant of the thermal system, via instructions provided by the processor.

Also in an exemplary embodiment, the step of determining the one or more characteristics includes determining, via the processor, a loss of fluid flow of the coolant of the thermal system, based on the flow data; and the step of adjusting the control includes adjusting the control of the thermal system for the thermal management of the device in a manner that remediates the loss of fluid flow, via instructions provided by the processor.

Also in an exemplary embodiment, the step of determining the one or more characteristics includes determining, via the processor, an aeration of the coolant of the thermal system, based on the flow data; and the step of adjusting the control includes adjusting the control of the thermal system for the thermal management of the device in a manner that remediates the aeration of the coolant, via instructions provided by the processor.

Also in an exemplary embodiment, the step of adjusting the control includes adjusting a speed of one or more pumps of the thermal system for the thermal management of the device, based on the one or more characteristics of the flow of the coolant of the thermal system, via instructions provided by the processor.

Also in an exemplary embodiment, the step of adjusting the control includes adjusting a power of a chiller of the thermal system that is coupled to the device, based on the one or more characteristics of the flow of the coolant of the thermal system, via instructions provided by the processor.

Also in an exemplary embodiment, the step of adjusting the control includes implementing one or more redundant cooling loops of the thermal system for the thermal management of the device, based on the one or more characteristics of the flow of the coolant of the thermal system, via instructions provided by the processor.

Also in an exemplary embodiment, the step of adjusting the control includes adjusting one or more upstream power limitations of the thermal system for the thermal management of the device, based on the one or more characteristics of the flow of the coolant of the thermal system, via instructions provided by the processor.

Also in an exemplary embodiment, the step of adjusting the control includes selectively implementing an emergency cooling system for the thermal management of the device, based on the one or more characteristics of the flow of the coolant of the thermal system, via instructions provided by the processor.

Also in an exemplary embodiment, the step of adjusting the control includes selectively alternating between separate flow versus combined flow of a plurality of loops for the flow of the coolant of the thermal system, based on the one or more characteristics of the flow of the coolant of the thermal system, via instructions provided by the processor.

In another exemplary embodiment, a control system is provided for controlling thermal management of a device via a thermal system. The control system includes a flow sensor and a processor. The flow sensor is configured to obtain flow data as to a flow of coolant of the thermal system. The processor is coupled to the flow sensor, and is configured to at least facilitate determining one or more characteristics of the flow of the coolant of the thermal system, based on the flow data; and adjusting control of the thermal system for the thermal management of the device, based on the one or more characteristics of the flow of the coolant of the thermal system, via instructions provided by the processor.

Also in an exemplary embodiment, the processor is further configured to at least facilitate determining a loss of fluid flow of the coolant of the thermal system, based on the flow data; and adjusting the control of the thermal system for the thermal management of the device in a manner that remediates the loss of fluid flow, via instructions provided by the processor.

Also in an exemplary embodiment, the processor is further configured to at least facilitate determining an aeration of the coolant of the thermal system, based on the flow data; and adjusting the control of the thermal system for the thermal management of the device in a manner that remediates the aeration of the coolant, via instructions provided by the processor.

Also in an exemplary embodiment, the processor is further configured to at least facilitate adjusting a speed of one or more pumps of the thermal system for the thermal management of the device, based on the one or more characteristics of the flow of the coolant of the thermal system, via instructions provided by the processor.

Also in an exemplary embodiment, the processor is further configured to at least facilitate adjusting a power of a chiller of the thermal system that is coupled to the device, based on the one or more characteristics of the flow of the coolant of the thermal system, via instructions provided by the processor.

Also in an exemplary embodiment, the processor is further configured to at least facilitate implementing one or more redundant cooling loops of the thermal system for the thermal management of the device, based on the one or more characteristics of the flow of the coolant of the thermal system, via instructions provided by the processor.

Also in an exemplary embodiment, the processor is further configured to at least facilitate adjusting one or more upstream power limitations of the thermal system for the thermal management of the device, based on the one or more characteristics of the flow of the coolant of the thermal system, via instructions provided by the processor.

Also in an exemplary embodiment, the processor is further configured to at least facilitate selectively implementing an emergency cooling system for the thermal management of the device, based on the one or more characteristics of the flow of the coolant of the thermal system, via instructions provided by the processor.

Also in an exemplary embodiment, the processor is further configured to at least facilitate selectively alternating between separate flow versus combined flow of a plurality of loops for the flow of the coolant of the thermal system, based on the one or more characteristics of the flow of the coolant of the thermal system, via instructions provided by the processor.

In another exemplary embodiment, a vehicle is provided that includes a body; a drive system; a device; a thermal system; and a control sensor. The drive system is configured to propel the body. The device is configured to perform one or more safety critical functions of the vehicle. The thermal system is coupled to and configured to provide thermal management for the device. The control system is coupled to the thermal system, and is configured for controlling the thermal management of the device via the thermal system. The control system includes a flow sensor and a processor. The flow sensor is configured to obtain flow data as to a flow of coolant of the thermal system. The processor is coupled to the flow sensor, and is configured to at least facilitate determining one or more characteristics of the flow of the coolant of the thermal system, based on the flow data; and adjusting control of the thermal system for the thermal management of the device, based on the one or more characteristics of the flow of the coolant of the thermal system, via instructions provided by the processor.

Also in an exemplary embodiment, the processor is further configured to at least facilitate determining a loss of fluid flow of the coolant of the thermal system, based on the flow data; determining an aeration of the coolant of the thermal system, based on the flow data; and adjusting the control of the thermal system for the thermal management of the device in a manner that remediates the loss of fluid flow and the aeration of the coolant, via instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
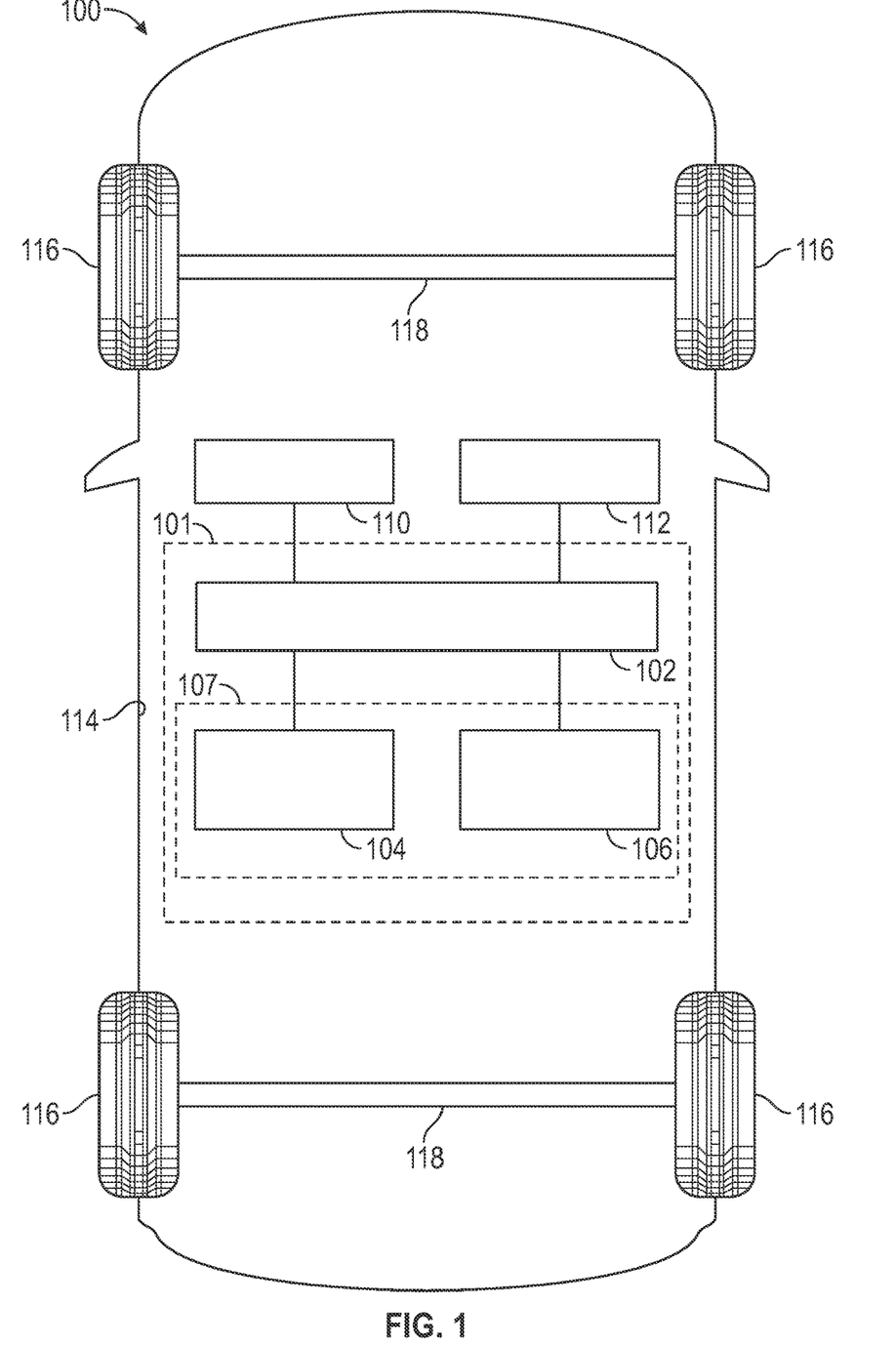
FIG. 1 is a functional block diagram of a vehicle that includes a safety critical device that requires thermal cooling, and that further includes a thermal system to perform the thermal cooling, along with an accompanying control system, in accordance with exemplary embodiments.

FIG. 1 illustrates a vehicle 100, according to an exemplary embodiment. As described in greater detail further below, the vehicle 100 includes, among other components, a device 102 requiring thermal cooling, along with a thermal system 104 and accompanying control system 106 for performing the thermal cooling. In various embodiments, the device 102 comprises one or more computers and/or other safety critical components. Also in various embodiments, the control system 106 controls the thermal cooling of the device 102 by the thermal system 104, including for remediating loss of coolant flow, aerated coolant, or both in the thermal management of the device 102 by the thermal system 104.

As depicted in FIG. 1, in various embodiments, the thermal system 104 and the control system 106 may collectively be referred to as to a thermal management system 107, and the combination of the thermal management system 107 and the device 102 itself may be referred to as a critical safety system 101 for ease of reference.

Figure 2:
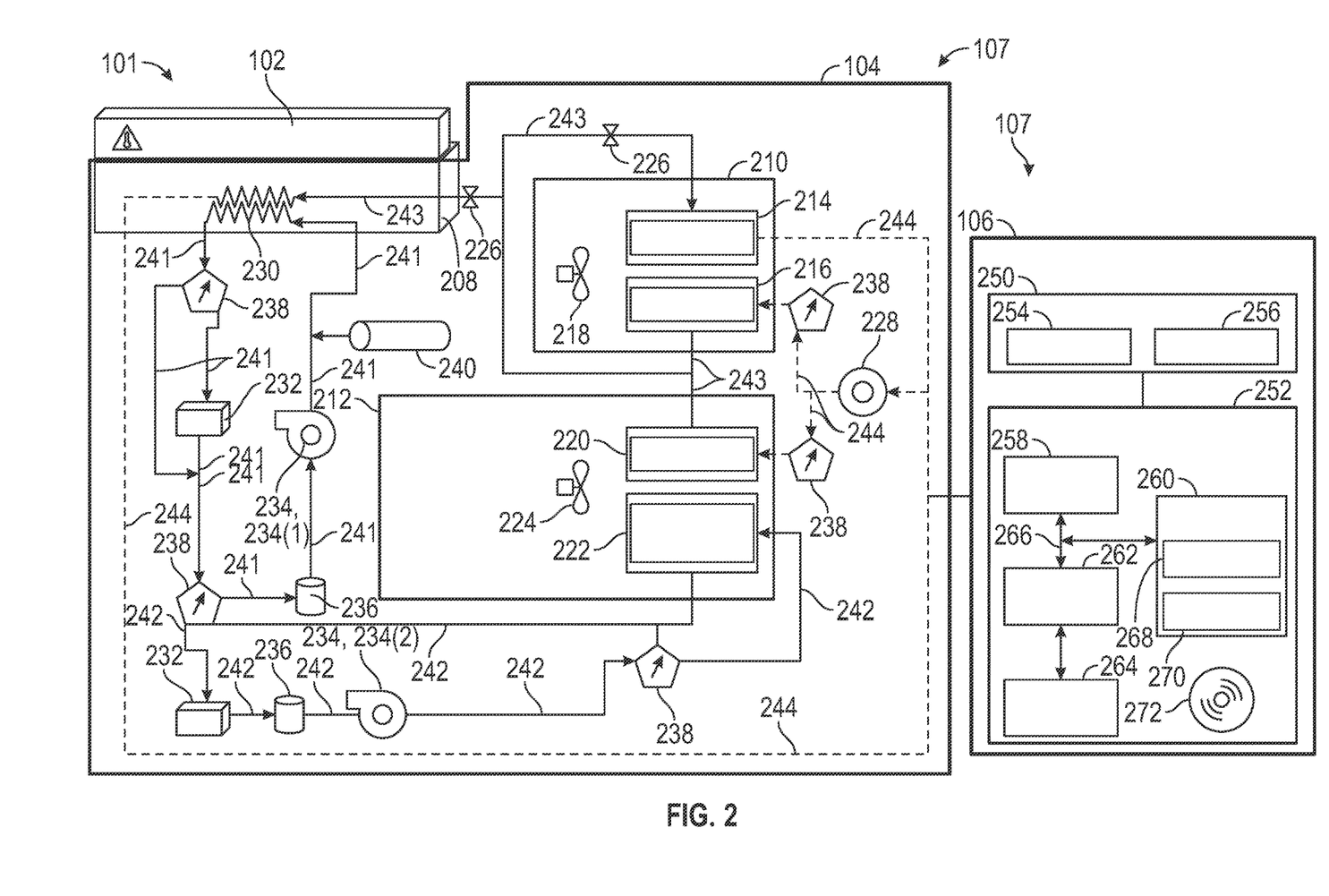
FIG. 2 is a functional block diagram of the thermal system and control system of FIG. 1, depicted along with the safety critical device of FIG. 1, in accordance with exemplary embodiments.

In accordance with exemplary embodiments, the critical safety system 101 is depicted in FIG. 2 with additional detail, and is described in greater detail further below in connection therewith.

Figure 3:
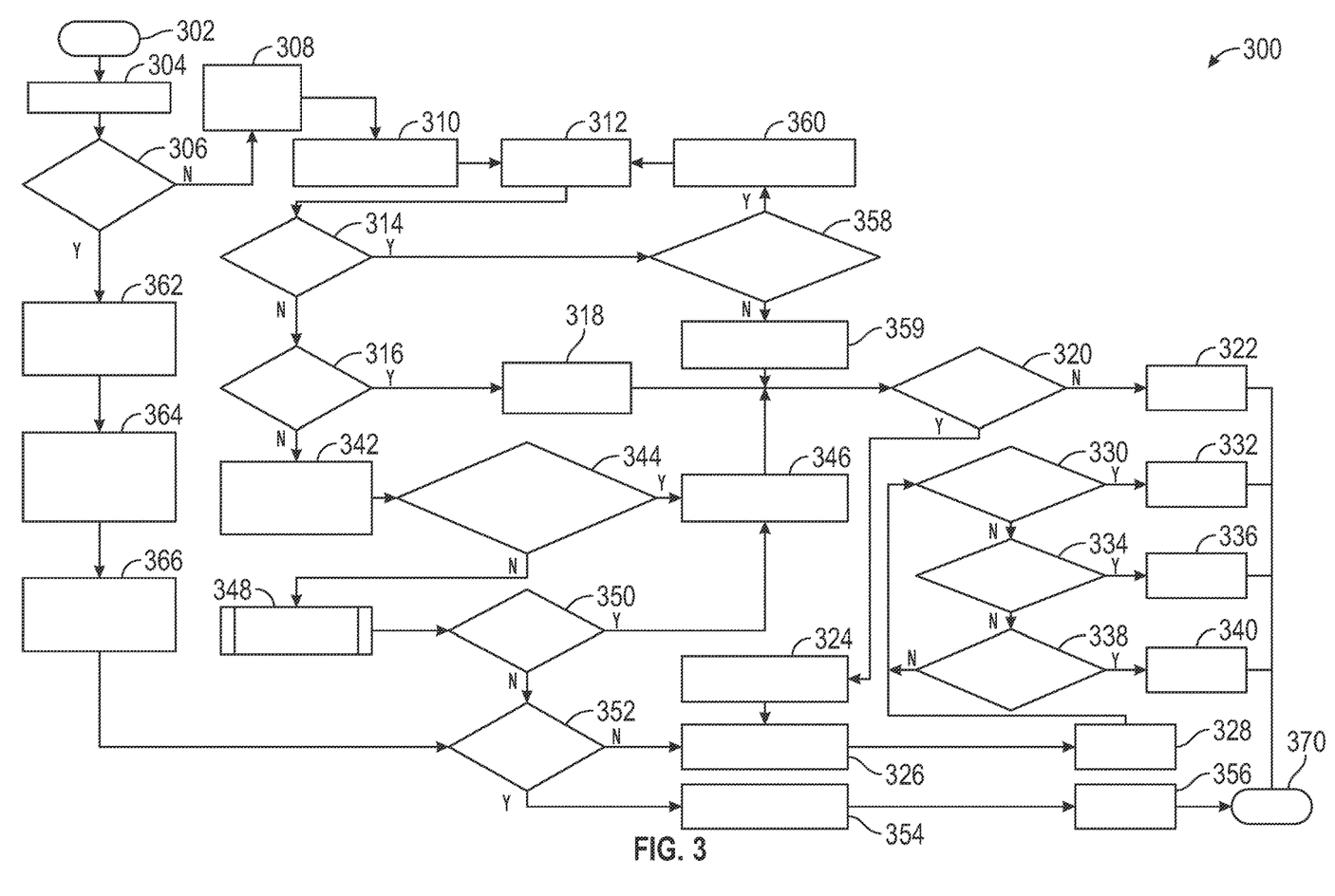
FIGS. 3 and 4 are flowcharts of a process for controlling thermal cooling of a device, and that can be implemented in connection with the thermal system, control system, and safety critical device of FIGS. 1 and 2 and the vehicle of FIG. 1 and components thereof, in accordance with exemplary embodiments.
Figure 4:
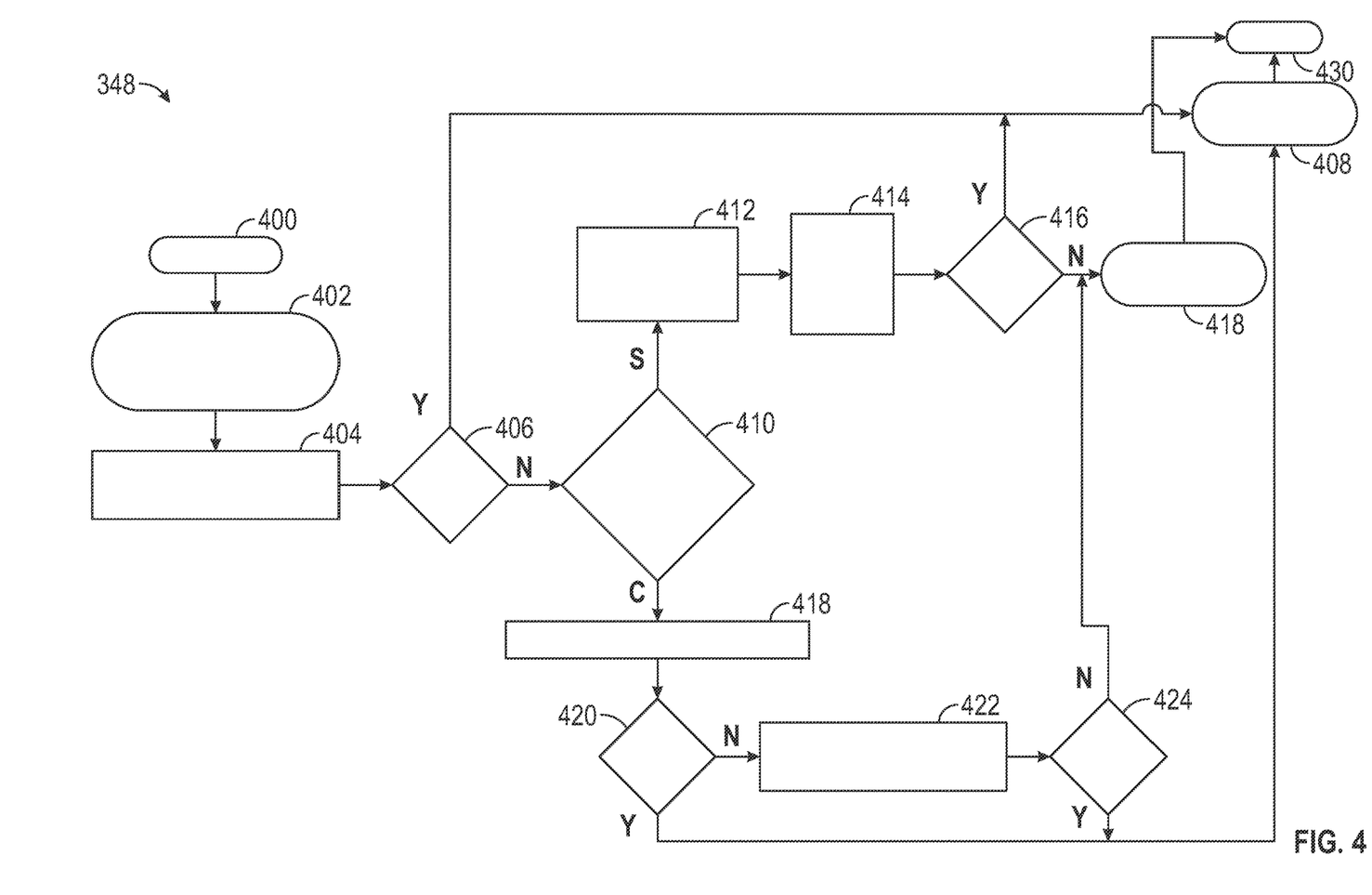

In addition, in various embodiments, the thermal control of the device 102 by the thermal system 104 and the control system 106 is performed in conjunction with steps of a thermal control process 300 that is depicted in FIGS. 3 and 4 and that is also described in greater detail further below in connection therewith.

As depicted in FIG. 1, the critical safety system 101 (including the device 102, the thermal system 104, and the control system 106) are depicted as part of the vehicle 100 in accordance with exemplary embodiments. In various embodiments, the vehicle 100 comprises an automobile, such as any one of a number of different types of automobiles, such as, for example, a sedan, a wagon, a truck, sport utility vehicle (SUV), or the like. In certain embodiments, the vehicle 100 may also comprise a motorcycle or other vehicle, such as aircraft, spacecraft, watercraft, and so on, and/or one or more other types of mobile platforms (e.g., a robot and/or another mobile platform). In yet other embodiments, the critical safety system 101 (including the device 102, the thermal system 104, and the control system 106) may instead be part of and/or coupled to any number of other types of platforms and/or other systems, moving or non-moving, such as a building, infrastructure, and/or other platforms and/or other systems.

In the depicted embodiment, the vehicle 100 includes a body 114 that is arranged on a chassis (not depicted in FIG. 1). The body 114 substantially encloses other components of the vehicle 100. The vehicle 100 also includes a plurality of wheels 116. The wheels 116 are each rotationally coupled to axles 118 near a respective corner of the body 114 to facilitate movement of the vehicle 100. In one embodiment, the vehicle 100 includes four wheels 116, although this may vary in other embodiments (for example for trucks, motorcycles, and certain other vehicles).

A drive system 110 is mounted on the chassis, and drives the wheels 116, for example via the axles 118. In certain embodiments, the drive system 110 comprises a propulsion system having one or more engines and/or motors.

In various embodiments, the vehicle 100 includes various other systems 112. For example, in various embodiments, the other systems 112 include one or more braking systems, steering systems, rechargeable energy storage systems (RESS), lighting systems, climate control systems, infotainment systems, and/or various other systems. In certain embodiments, one or more of the drive system 110 and/or other systems 112 may be controlled, in whole or in part, by the device 102 (e.g., via a vehicle onboard computer that comprises a critical component corresponding to the device 102). In certain embodiments, the drive system 110 and/or other systems 112 may also be controlled, in whole or in part, by the control system 106 and/or by one or more other systems and/or devices.

With reference to FIG. 2, a functional block diagram of the critical safety system 101 of the vehicle 100, in accordance with exemplary embodiments. Specifically, FIG. 2 provides additional details as to the thermal management system 107, including the thermal system 104 and the control system 106 thereof, that provide and control the thermal cooling of the device 102, in accordance with an exemplary embodiment.

As depicted in FIG. 2, in various the device 102 (e.g., a safety critical component, such as a computer of the vehicle 100 of FIG. 1) is cooled by the thermal system 104, which in turn is controlled by the control system 106.

Also as depicted in FIG. 2, in various embodiments, the thermal system 104 includes a chiller 208, in addition to a climate control system 210 and a radiator fan module 212, along with various other components as described below.

In various embodiments, the chiller 208 comprises an integrated chiller and cold plate. In certain embodiments, the chiller 208 is connected to and/or otherwise coupled against the device 102, as depicted in FIG. 2. In various embodiments, the chiller 208 is positioned adjacent to and/or integrated with the device 102, and provides cooling directly thereto. In certain embodiments, the chiller 208 includes a two channel cold plate that is designed to exchange thermal energy between cooling paths or loops and the device 102, and between the refrigerant and the coolant channel. In certain embodiments, the cold plate is part of the device 102, and is combined with the chiller 208 as a sign unit.

Also in various embodiments, the climate control system 210 includes an evaporator 214, a condenser 216, and a fan 218. In various embodiments, the climate control system 210 comprises a cabin heating, ventilation, and air conditioning (HVAC) system for the vehicle 100 of FIG. 1.

Also in various embodiments, the radiator fan module 212 includes a condenser 220, a low temperature radiator 222, and a fan 224. In various embodiments, the radiator fan module 212 comprises a front condenser radiator fan module for the vehicle 100 of FIG. 1.

Also in various embodiments, the thermal system 104 also includes a plurality of electronically controlled expansion valves (EXV) 226, along with a compressor 228, a heat exchanger/chiller 230 (e.g., that is part of and/or coupled to the chiller 208), a thermally managed device 232, a plurality of cooling pumps 234 (namely, a first pump 234(1) and a second pump 234(2)), a plurality of coolant surge tanks 236, a plurality of control valves 238, and an emergency cooling system 240.

As depicted in FIG. 2, in various embodiments, a first coolant loop 241 provides coolant to the heat exchanger/chiller 230 (and thereby to the chiller 208) via the first pump 234(1) and the emergency cooling system 240, and as facilitated via the thermally managed device 232, the coolant surge tanks 236, and the control valves 238 of the first coolant loop 241 as depicted in FIG. 2.

Also as depicted in FIG. 2, a second coolant loop 242 provides coolant to the low temperature radiator 222 via the second pump 234(2), and as facilitated via the thermally managed device 232, the coolant surge tanks 236, and the control valves 238 of the second coolant loop 242 as depicted in FIG. 2.

In various embodiments, the control valves 238 are utilized for controlling the first and second coolant loops 241, 242, such that the first and second coolant loops 241, 242 may be selectively combined with one another or separated from one another, depending on the circumstances.

In addition, in certain embodiments, the emergency cooling system 240 injects ammonium nitrite into the coolant stream (in addition to the coolant already in the coolant stream) as appropriate for further decreasing of the temperature, for example in circumstances in which the first and second coolant loops 241, 242 may not otherwise be effective in reducing the temperature of the device 102 to a desired temperature value or range, and/or if the coolant flow stops. In one exemplary embodiment, the injects ammonium nitrite into the coolant stream (in addition to the coolant already in the coolant stream). In various other embodiments, one or more other and/or additional techniques may be used for the emergency cooling system 240.

Also as depicted in FIG. 2, in various embodiments, first branch 243 of a refrigerant loop provides liquid refrigerant to the heat exchanger/chiller 230 (and thereby to the chiller 208) via the radiator fan module 212, and as regulated via the EXV 226 of the first branch 243 of the refrigerant loop as depicted in FIG. 2. Also in various embodiments, the first branch 243 of the refrigerant loop also provides liquid refrigerant to the climate control system 210 (and as regulated via the EXV 226) for operation of the climate control system 210 as depicted in FIG. 2.

In addition, also as depicted in FIG. 2, in various embodiments, a second branch 244 of the refrigerant loop provides gas refrigerant to the heat exchanger/chiller 230 (and thereby to the chiller 208) as depicted in FIG. 2. Also in various embodiments, the second branch 244 of the refrigerant loop also provides gas refrigerant via the compressor 228 (and as regulated by the control valves 238 coupled thereto) to the radiator fan module 212 and the climate control system 210 for operation of the respective condensers 220, 216 thereof as depicted in FIG. 2.

In various embodiments, the first and second branches 243, 244 of the refrigerant loop provide redundancy for the first and second coolant loops 241, 242.

As depicted in FIG. 2, in various embodiments the control system 106 is coupled to the thermal system 104. In certain embodiments, the control system 106 (and/or components thereof) may also be part of the thermal system, and/or as part of the combined thermal management system 107 as depicted in FIG. 2.

Also as depicted in FIG. 2, in various embodiments, the control system 106 includes a sensor array 250 and a controller 252, as described in greater detail below.

In various embodiments, the sensor array 250 includes various sensors that obtain sensor data for controlling thermal management of the device 102. In various embodiments, the sensor array includes a flow sensor 254 that measures fluid flow within the thermal system 104, including a level of fluid flow and a measure of aeration thereof. In certain embodiments, one or more other sensors 256 may also be utilized (e.g., one or more temperature sensors, and so on).

In various embodiments, the controller 252 is coupled to the sensor array 250 and receives sensor data therefrom. In various embodiments, the controller 252 is further coupled to the thermal system 104. In addition, in certain embodiments, the controller 252 may also be coupled to one or more other systems and/or devices of the vehicle 100, such as the device 102, the drive system 110, and/or other systems 112, for example for receiving input thereof and/or for controlling thereof.

In various embodiments, the controller 252 controls operation of the thermal system 104, including for cooling of the device 102. In various embodiments, the controller 252 provides these functions in accordance with the steps of the process 300 that is depicted in FIGS. 3 and 4 and described in greater detail further below in connection therewith.

As depicted in FIG. 1, in various embodiments, the controller 252 comprises a computer system (also referred to herein as computer system 252), and includes a processor 258, a memory 260, an interface 262, a storage device 264, and a computer bus 266.

The processor 258 performs the computation and control functions of the controller 252, and may comprise any type of processor or multiple processors, single integrated circuits such as a microprocessor, or any suitable number of integrated circuit devices and/or circuit boards working in cooperation to accomplish the functions of a processing unit. During operation, the processor 258 executes one or more programs 268 contained within the memory 260 and, as such, controls the general operation of the controller 252 and the computer system of the controller 252, generally in executing the processes described herein, such as the process 300 of FIGS. 3 and 4 and described further below in connection therewith.

The memory 260 can be any type of suitable memory, including various types of non-transitory computer readable storage medium. In certain examples, the memory 260 is located on and/or co-located on the same computer chip as the processor 258. In the depicted embodiment, the memory 260 stores the above-referenced program 268 along with stored values 270 (e.g., look-up tables, thresholds, and/or other values with respect to control of the thermal system 104).

The interface 262 allows communication to the computer system of the controller 252, for example from a system driver and/or another computer system, and can be implemented using any suitable method and apparatus. In one embodiment, the interface 262 obtains the various data from the sensor array 250, among other possible data sources. The interface 262 can include one or more network interfaces to communicate with other systems or components. The interface 262 may also include one or more network interfaces to communicate with technicians, and/or one or more storage interfaces to connect to storage apparatuses, such as the storage device 264.

The storage device 264 can be any suitable type of storage apparatus, including various different types of direct access storage and/or other memory devices. In one exemplary embodiment, the storage device 264 comprises a program product from which memory 260 can receive a program 268 that executes one or more embodiments of one or more processes of the present disclosure, such as the steps of the process 300 of FIGS. 3 and 4 and described further below in connection therewith. In another exemplary embodiment, the program product may be directly stored in and/or otherwise accessed by the memory 260 and/or a disk (e.g., disk 272), such as that referenced below.

The bus 266 serves to transmit programs, data, status and other information or signals between the various components of the computer system of the controller 252. The bus 266 can be any suitable physical or logical means of connecting computer systems and components. This includes, but is not limited to, direct hard-wired connections, fiber optics, infrared and wireless bus technologies. During operation, the program 268 is stored in the memory 260 and executed by the processor 258.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 258) to perform and execute the program.

FIGS. 3 and 4 are flowcharts of a process 300 for controlling thermal cooling of a device, in accordance with an exemplary embodiment. In various embodiments, the process 300 can be implemented in connection with the thermal system 104, control system 106, and device 102 of FIGS. 1 and 2 and the vehicle 100 of FIG. 1 and components thereof, in accordance with exemplary embodiments.

As depicted in FIG. 3, in various embodiments, the process 300 begins at step 302. In one embodiment, the process 300 begins when the device 102 begins operation and/or requires thermal cooling.

In various embodiments, data is obtained (step 304). In various embodiments, data is obtained from the sensor array 250 of FIG. 2, including flow rate data within the thermal system 104 via one or more flow sensors 254. In various embodiments, flow rate data is obtained with respect to one or more of the first and second coolant loops 241, 242 and/or one or more of the refrigerant loops 243, 244 of the thermal system 104 of FIG. 2. In certain embodiments, flow rate data is obtained as to the flow of coolant in both of the first and second coolant loops 241, 242 and as to the flow of refrigerant in both of the refrigerant loops 243, 244. Also in certain embodiments, other data may be obtained, such as the temperature and/or other parameters pertaining to the vehicle 100 of FIG. 1, the device of FIGS. 1 and 2, and/or the thermal system 104 and/or components thereof of FIG. 2.

In an exemplary embodiment, a determination is determined as to whether coolant loss is detected (step 306). Specifically, in various embodiments, a processor (such as the processor 258 of FIG. 2) determines whether a loss of coolant is detected in the first coolant loop 241, the second coolant loop 242, or both, based on the data of step 304 from the flow sensors 254. Also in certain embodiments, coolant loss is detected when an amount of coolant and/or a flow thereof in one or both of the first or second coolant loops 241, 242 is reduced below a predetermined threshold.

In various embodiments, if it is determined in step 306 that coolant loss is detected, then a determination is made as to the desired flow rate (step 308). In certain embodiments, this determination is made based on a typical or expected flow rate, and/or based on one or more other parameters (such as a temperature of the device 102 and/or of one or both of the first or second coolant loops 241, 242, and so on). Also in certain embodiments, this determination is made by a processor (such as the processor 258 of FIG. 2) based on the data of step 304 from the flow sensors 254.

Also in various embodiments, the flow rate is set equal to the desired flow rate (step 310). Specifically, in various embodiments, during step 310, a current flow rate for the coolant for the first and/or second coolant loops 241, 242 is set equal to the desired flow rate of step 308 via instructions provided by a processor (such as the processor 258 of FIG. 2) to a pump (such as the first pump 234(1) of FIG. 2).

Also in various embodiments, an actual flow rate is measured (step 312). In various embodiments, during step 312, one or more flow sensors 254 of FIG. 2 measure an actual flowrate for the first and/or second coolant loops 241, 242.

In various embodiments, a determination is made as to whether the flow rate is excessive (step 314). Specifically, in various embodiments, a processor (such as the processor 258 of FIG. 2) determines whether the flow rate of step 312 exceeds a predetermined threshold.

In various embodiments, if it is determined in step 314 that the flow rate is not excessive, then a determination is made as to whether the flow rate is correct (step 316). In various embodiments, this determination is made by a processor (such as the processor 258 of FIG. 2) based on the data of step 304, including for example as to whether the flow sensors 254 of FIG. 2 are operating correctly.

In various embodiments, if it is determined in step 316 that the flow rate is correct, then a determination is made that there are no faults present (step 318). Specifically, in various embodiments, during step 318, a processor (such as the processor 258 of FIG. 2) sets a fault status to "none" during step 318.

Also in various embodiments, a determination is made as to whether the flow is aerated (step 320). In various embodiments, this determination is made by a processor (such as the processor 258 of FIG. 2) based on the data of step 304 (e.g., from one or more flow sensors 254 of FIG. 2) as to whether an amount of air exceeds a predetermined threshold in either or both of the first and second coolant loops 241, 242.

In various embodiments, if it is determined in step 320 that the flow is not aerated, then a first group of settings for the thermal system 104 are implemented (step 322). Specifically, in various embodiments, during step 322, the first group of settings include the following: (i) a coolant chilling power of the chiller 208 is set to optimized (i.e., to an optimized level that would correspond to an optimal setting if thermal considerations were not included); (ii) a fail operation cooling mode is set to optimized (i.e., to an optimized level that would correspond to an optimal setting if thermal considerations were not included); (iii) an alternative flow path is set to optimized (i.e., to an optimized level that would correspond to an optimal setting if thermal considerations were not included); (iv) a coolant loop combination is set to optimized (i.e., to an optimized level that would correspond to an optimal setting if thermal considerations were not included); (v) an upstream power limit is set to normal (e.g., a standard or typical setting for the thermal system 104); (vi) an emergency cooling is set to none (i.e., such that emergency coolant is not provided or needed); (vii) a compute distribution function is set to optimized (i.e., to an optimized level that would correspond to an optimal setting if thermal considerations were not included); and (viii) a compute power limit is set to normal (i.e., a typical or standard setting for the thermal system 104). In various embodiments, each of the "optimal" settings (e.g., as referred to above) comprise respective settings that would balance thermal performance and energy efficiency under conditions of correct (or typical) coolant flowrate without aeration. In various embodiments, the process 300 then terminates at step 370.

With reference back to step 320, if is determined in step 320 that the flow is aerated, then the process 300 proceeds instead to step 324. In various embodiments, during step 324, the target flowrate is set to remediate. In various embodiments, this is performed via instructions provided via a processor (such as the processor 258 of FIG. 2).

In various embodiments, the fault status is set to a "degraded" fault status (step 326). In various embodiments, this is performed via instructions provided via a processor (such as the processor 258 of FIG. 2). Also in various embodiments, a "degraded" power state refers to a condition in which the thermal system 104 (or components thereof) are still performing, but not at an expected or optimal level of performance.

Also in various embodiments, the process 300 then proceeds to step 328, as a second group of settings are implemented for the thermal system 104. Specifically, in various embodiments, the second group of settings of step 328 include the following: (i) setting the coolant chiller power to "enhanced" (i.e., increasing the power); and (ii) setting the fail operation cooling mode to "both". Also in various embodiments, during step 328, the setting settings are implemented via instructions provided by a processor (such as the processor 258 of FIG. 2).

In addition, in various embodiments, the process 300 then proceeds to step 330 as depicted in FIG. 3. During step 330, a determination is made as to whether the thermal status is "normal". In various embodiments, during step 330, a determination is made by a processor (such as the processor 258 of FIG. 2) as to whether a temperature is within a first predetermined range (i.e., such that the temperature is greater than a first predetermined temperature threshold and less than a second predetermined temperature threshold). In certain embodiments, the temperature refers to one or more temperatures of the thermal system 104, such as in one of the first or second coolant loops 241, 242 thereof.

In various embodiments, if it is determined in step 330 that the thermal status is normal (i.e., within the first predetermined range of step 330), then a third group of settings are implemented (step 332). Specifically, in various embodiments, the third group of settings of step 332 include the following: (i) setting the upstream power limit to a low power setting; (ii) setting an emergency cooling setting to a standby mode; (iii) setting a computer distribution function to optimized (i.e., to an optimized level that would correspond to an optimal setting if thermal considerations were not included); and (iv) setting a compute power limit function to a low power mode. Also in various embodiments, during step 332, the third group of settings are implemented via instructions provided by a processor (such as the processor 258 of FIG. 2). In various embodiments, each of the "optimal" settings (e.g., as referred to above) comprise respective settings that would balance thermal performance and energy efficiency under conditions of correct (or typical) coolant flowrate without aeration. In various embodiments, the process 300 then terminates at step 370.

With reference back to step 330, in various embodiments, if it is determined in step 330 that the thermal status is not normal (i.e., that the temperature is not within the first range of step 330), then the process proceeds instead to step 334.

In various embodiments, during step 334, a determination is made as to whether the thermal status is hot. In various embodiments, this determination is made by a processor (such as the processor 258 of FIG. 2) as to whether the temperature is within a second range of temperatures that is greater than the first range of step 330 (i.e., such that the temperature is greater than the second predetermined temperature threshold of step 330 but less than a third predetermined threshold). Similar to the discussion above, in certain embodiments, the temperature refers to one or more temperatures of the thermal system 104, such as in one of the first or second coolant loops 241, 242 thereof.

In various embodiments, if it is determined in step 334 that the thermal status is hot (i.e., within the second predetermined range of step 334), then a fourth group of settings are implemented (step 336). Specifically, in various embodiments, the fourth group of settings of step 336 include the following: (i) setting the upstream power limit to a safe minimum value (i.e., to a minimum value that still provides safe operation); (ii) setting the emergency cooling mode to standby; (iii) setting the computing distribution mode to rotating; and (iv) setting the compute power limit to a safe minimum (i.e., to a minimum value that still provides safe operation). Also in various embodiments, during step 336, the fourth group of settings are implemented via instructions provided by a processor (such as the processor 258 of FIG. 2). In various embodiments, the process 300 then terminates at step 370.

With reference back to step 334, in various embodiments, if it is determined in step 330 that the thermal status is not hot (i.e., that the temperature is not within the second temperature range of step 334), then the process proceeds instead to step 338. In various embodiments, during step 338, a determination is made as to whether the thermal status is very hot. In various embodiments, this determination is made by a processor (such as the processor 258 of FIG. 2) as to whether the temperature is within a third range of temperatures that is greater than the second range of step 334 (i.e., such that the temperature is greater than the third predetermined temperature threshold of step 334).

In various embodiments, if it is determined in step 338 that the thermal status is very hot (i.e., that the temperature is within the third range of step 338), then a fifth group of settings are implemented (step 340). Specifically, in various embodiments, the fifth group of settings of step 340 include the following: (i) setting the upstream power limit to a safe minimum value (i.e., to a minimum value that still provides safe operation); (ii) setting the emergency cooling mode to correspond to a coolant temperature reduction; (iii) setting the computing distribution mode to rotating; and (iv) setting the compute power limit to a safe minimum (i.e., to a minimum value that still provides safe operation). Also in various embodiments, during step 340, the fifth group of settings are implemented via instructions provided by a processor (such as the processor 258 of FIG. 2). In various embodiments, the process 300 then terminates at step 370.

With reference back to step 316, in various embodiments, if it is determined in step 316 that the flow rate is not correct, then the process 300 proceeds instead to step 342. In various embodiments, during step 342, a pump speed is increased. In various embodiments, a speed of the first pump 234(1) of FIG. 2 is increased in order to compensate for the flow rate, in accordance with instructions provided by the processor 258 of FIG. 2.

In various embodiments, a determination is then made as to whether the pump speed compensation of step 342 was successful in accomplishing the correct flow rate (step 344). In various embodiments, this determination of step 344 is performed by a processor (such as the processor 258 of FIG. 2) using updated flow sensor data from the flow sensors 254 of FIG. 2.

In various embodiments, if it is determined in step 344 that the pump speed compensation was successful in accomplishing the correct flow rate, then the process 300 proceeds to step 346. In various embodiments, during step 346, the fault status is set to "degraded". In various embodiments, this is performed by a processor (such as the processor 258 of FIG. 2). Also in various embodiments, the process 300 then proceeds to the above-described 320, as depicted in FIG. 3.

Conversely, in various embodiments, if it is instead determined in step 344 that the pump speed compensation was not successful in accomplishing the correct flow rate, then the process 300 proceeds instead to step 348. In various embodiments, during step 348, test paths are performed. In various embodiments, the test paths are performed via a processor (such as the processor 258 of FIG. 2)

With reference to FIG. 4, a flowchart is provided for step 348 of FIG. 3, namely the performing of test flow paths. As depicted in FIG. 4, in various embodiments this begins at step 400 (i.e., based on a determination in step 344 of FIG. 3 that the pump speed compensation did not successfully accomplish the correct flow rate).

As depicted in FIG. 4, in various embodiments, flow rate resolution is attempted by flow path adjustment (step 402). Specifically, in certain embodiments, this includes a setting of an alternative flow path into a split flow path (step 404). In various embodiments, this is performed by a processor (such as the processor 258 of FIG. 2).

In various embodiments, a determination is made as to whether the flow rate has been successfully corrected (i.e., fixed) (step 406). In various embodiments, this determination is made by a processor (such as the processor 258 of FIG. 2).

In various embodiments, if it is determined in step 406 that the flow rate has been successfully corrected, then the process proceeds to step 408. In various embodiments, during step 408 the flow rate is remediated. In various embodiments, the sub-process of step 348 then terminates at step 430, and the process 300 then returns to FIG. 3, beginning with step 350 as described further below.

Conversely, in various embodiments, if it is instead determined in step 406 that the flow rate has not been successfully corrected, then the process proceeds instead to step 410. In various embodiments, during step 410, a determination is made as to whether the thermal system 104 is currently operating in separate modes (e.g., separate modes for the first coolant loop 241 and the second coolant loop 242) versus a loop combination mode (e.g., a combined mode for both the first and second coolant loops 241, 242). In various embodiments, this determination is made by a processor (such as the processor 258 of FIG. 2).

In various embodiments, if it is determined in step 410 that the thermal system 104 is currently operating in separate modes, then the process proceeds to step 412. In various embodiments, during step 412, the operating mode is set to a flow combination mode (e.g., a combined mode for both the first and second coolant loops 241, 242). In various embodiments, this is implemented via instructions that are provided by a processor (such as the processor 258 of FIG. 2).

Also in various embodiments, a pump speed is increased (step 414). In various embodiments, a speed of the second pump 234(2) is increased to a maximum allowable speed for the second pump 234(2) (e.g., according to its safety specifications, or the like), in accordance with instructions provided by a processor (such as the processor 258 of FIG. 2).

In various embodiments, a determination is then made as to whether the flow rate has been successfully corrected (i.e., fixed) (step 416). In various embodiments, this determination is made by a processor (such as the processor 258 of FIG. 2) via updated sensor data from one or more flow sensors 254 of FIG. 2.

In various embodiments, if it is determined in step 416 that the flow rate has been successfully corrected, then the process proceeds to the above-described step 408. In various embodiments, as described above, the flow rate is remediated in step 408, the sub-process of step 348 terminates (step 430), and the process 300 then returns to FIG. 3, beginning with step 350 as described further below.

Conversely, in various embodiments, if it is instead determined in step 416 that the flow rate has not been successfully corrected, then the flow rate is not remediated (step 418). In various embodiments, the sub-process of step 348 terminates (step 430), and the process 300 then returns to FIG. 3, beginning with step 350 as described further below.

With reference back to step 410, in various embodiments, if it is instead determined in step 410 that the thermal system 104 is currently operating in a loop combination mode, then the process proceeds instead to step 418. In various embodiments, during step 418, the operating mode continues in the loop combination mode, and a pump speed is increased. In various embodiments, a speed of the second pump 234(2) is increased to a maximum allowable speed for the second pump 234(2) (e.g., according to its safety specifications, or the like), in accordance with instructions provided by a processor (such as the processor 258 of FIG. 2).

In various embodiments, a determination is then made as to whether the flow rate has been successfully corrected (i.e., fixed) (step 420). In various embodiments, this determination is made by a processor (such as the processor 258 of FIG. 2) based on updated sensor data from one or more of the flow sensors 254 of FIG. 2.

In various embodiments, if it is determined in step 420 that the flow rate has been successfully corrected, then the process proceeds to the above-described step 408. In various embodiments, as described above, the flow rate is remediated in step 408, the sub-process of step 348 terminates (step 430), and the process 300 then returns to FIG. 3, beginning with step 350 as described further below.

Conversely, in various embodiments, if it is instead determined in step 420 that the flow rate has not been successfully corrected, then the process proceeds instead to step 422. In various embodiments, during step 422, the operating mode is set to a separate mode (e.g., separate modes for the first coolant loop 241 versus the second coolant loop 242). In various embodiments, this is implemented via instructions that are provided by a processor (such as the processor 258 of FIG. 2).

In various embodiments, a determination is then made as to whether the flow rate has been successfully corrected (i.e., fixed) (step 424). In various embodiments, this determination is made by a processor (such as the processor 258 of FIG. 2) using updated flow sensor data from one or more of the flow sensors 254 of FIG. 2.

In various embodiments, if it is determined in step 424 that the flow rate has been successfully corrected, then the process proceeds to the above-described step 408. In various embodiments, as described above, the flow rate is remediated in step 408, the sub-process of step 348 terminates (step 430), and the process 300 then returns to FIG. 3, beginning with step 350 as described further below.

Conversely, in various embodiments, if it is instead determined in step 424 that the flow rate has not been successfully corrected, then the process proceeds instead to the above-described step 418, in which the flow rate is not remediated. In various embodiments, the sub-process of step 348 terminates (step 430), and the process 300 then returns to FIG. 3, beginning with step 350 as described further below.

With reference back to FIG. 3, in various embodiments, a determination is made as to whether the flow rate is remediated (step 350). In various embodiments, this determination is made by a processor (such as the processor 258 of FIG. 2) based on the subroutines of step 348 as described above with reference to FIG. 4.

In various embodiments, if it is determined in step 350 that the flow rate is remediated, then the process proceeds to the above-referenced step 346, in which the fault status is set to "degraded" and the process then continues to step 320 and beyond.

Conversely, in various embodiments, if it is instead determined in step 350 that the flow rate is not remediated, then the process proceeds instead to step 352. In various embodiments, during step 352, a determination is made as to whether the flow rate is equal to zero. In various embodiments, this determination is made by the processor 258 of FIG. 2 using sensor data from the flow sensor 254 of FIG. 2.

In various embodiments, if it is determined in step 352 that the flow rate is not equal to zero, then the process proceeds to the above-described step 326. As described above, in various embodiments, the fault status is set to "degraded" in step 326, and the process then proceeds to step 328 with implementation of the second group of settings thereof as described above.

Conversely, in various embodiments, if it is instead determined in step 352 that the flow rate is equal to zero, then the process proceeds instead to step 354. In various embodiments, during step 354, the fault status is set to "faulted" by a processor (such as the processor 258 of FIG. 2).

In various embodiments, the process then proceeds to step 356, in which a sixth group of settings are implemented. Specifically, in various embodiments, during step 356, the sixth group of settings include the following: (i) a coolant chilling power of the chiller 208 is set to a reduced level; (ii) a fail operation cooling mode is set to both; (iii) an upstream power limit is set to a safe minimum level; (iv) an emergency cooling is set to include coolant flow replacement in addition to temperature reduction; (v) the compute distribution function is set to rotating; and (vi) the compute power limit is set equal to a safe minimum value. In various embodiments, these settings are implemented via the processor 258 of FIG. 2. In various embodiments, the process 300 then terminates at step 370.

Accordingly, methods, systems, and vehicles are provided for controlling thermal management of devices, including computers and/or other critical components of vehicles and/or other platforms. In various embodiments, the methods and techniques described herein measure flow rate and aeration of coolant in the thermal system, and provide for increased pump speed, enhanced chiller power, redundant cooling methods, upstream power limitations and other techniques as appropriate to remediate low flow rate and aeration while providing thermal management for the devices.

It will be appreciated that the systems, vehicles, and methods may vary from those depicted in the Figures and described herein. For example, the vehicle 100 of FIG. 1, including the critical safety system 101 and/or other components thereof, may vary in different embodiments from that depicted in FIG. 1 and/or described above in connection therewith. It will also be appreciated that the device 102, the thermal system 104, and the control system 106 and/or components thereof and/or implementation thereof may also differ from those depicted in FIG. 2 and/or as described above in connection therewith. It will similarly be appreciated that the steps of the process 300 may differ from that depicted in FIGS. 3 and 4, and/or that various steps of the process 300 may occur concurrently and/or in a different order than that depicted in FIGS. 3 and 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling thermal management of a device including a computer via a thermal system including a climate control system, the method comprising:
    obtaining, via a flow sensor, flow data as to a flow of coolant of the thermal system;
    determining, via a processor, one or more characteristics of the flow of the coolant of the thermal system, including an aeration of the coolant of the thermal system, based on the flow data; and
    adjusting control of the thermal system for the thermal management of the device in a manner that remediates the aeration of the coolant, based on the one or more characteristics of the flow of the coolant of the thermal system, via instructions provided by the processor.

2. The method of claim 1, wherein:
    the step of determining the one or more characteristics further comprises determining, via the processor, a loss of fluid flow of the coolant of the thermal system, based on the flow data; and
    the step of adjusting the control further comprises adjusting the control of the thermal system for the thermal management of the device in a manner that remediates the loss of fluid flow, via instructions provided by the processor.

3. The method of claim 2, wherein the step of adjusting the control further comprises:
    adjusting a speed of one or more pumps of the thermal system for the thermal management of the device, based on the one or more characteristics of the flow of the coolant of the thermal system, via instructions provided by the processor.

4. The method of claim 2, wherein the step of adjusting the control further comprises:
    adjusting a power of a chiller of the thermal system that is coupled to the device, based on the one or more characteristics of the flow of the coolant of the thermal system, via instructions provided by the processor.

5. The method of claim 2, wherein the step of adjusting the control further comprises:
    implementing one or more redundant cooling loops of the thermal system for the thermal management of the device, based on the one or more characteristics of the flow of the coolant of the thermal system, via instructions provided by the processor.

6. The method of claim 2, wherein the step of adjusting the control further comprises:
    adjusting one or more upstream power limitations of the thermal system for the thermal management of the device, based on the one or more characteristics of the flow of the coolant of the thermal system, via instructions provided by the processor.

7. The method of claim 2, wherein the step of adjusting the control further comprises:
    selectively implementing an emergency cooling system, based on the one or more characteristics of the flow of the coolant of the thermal system, via instructions provided by the processor.

8. The method of claim 2, wherein the step of adjusting the control further comprises:
    selectively alternating between separate flow versus combined flow of a plurality of loops for the flow of the coolant of the thermal system, based on the one or more characteristics of the flow of the coolant of the thermal system, via instructions provided by the processor.

9. A control system for controlling thermal management of a device including a computer via a thermal system including a climate control system, the control system comprising:
    a flow sensor configured to obtain flow data as to a flow of coolant of the thermal system; and
    a processor that is coupled to the flow sensor and that is configured to at least facilitate:
        determining one or more characteristics of the flow of the coolant of the thermal system, including by determining a loss of fluid flow of the coolant of the thermal system and determining an aeration of the coolant of the thermal system, based on the flow data; and
        adjusting control of the thermal system for the thermal management of the device in a manner that remediates the loss of fluid flow and the aeration of the coolant, based on the one or more characteristics of the flow of the coolant of the thermal system, via instructions provided by the processor.

10. The control system of claim 9, wherein the processor is further configured to at least facilitate adjusting the control of the thermal system for the thermal management of the device in a manner that remediates the loss of fluid flow further by adjusting a speed of one or more pumps of the thermal system for the thermal management of the device, based on the one or more characteristics of the flow of the coolant of the thermal system, via instructions provided by the processor.

11. The control system of claim 9, wherein the processor is further configured to at least facilitate adjusting the control of the thermal system for the thermal management of the device in a manner that remediates the loss of fluid flow further by adjusting a power of a chiller of the thermal system that is coupled to the device, based on the one or more characteristics of the flow of the coolant of the thermal system, via instructions provided by the processor.

12. The control system of claim 9, wherein the processor is further configured to at least facilitate adjusting the control of the thermal system for the thermal management of the device in a manner that remediates the loss of fluid flow further by implementing one or more redundant cooling loops of the thermal system for the thermal management of the device, based on the one or more characteristics of the flow of the coolant of the thermal system, via instructions provided by the processor.

13. The control system of claim 9, wherein the processor is further configured to at least facilitate adjusting the control of the thermal system for the thermal management of the device in a manner that remediates the loss of fluid flow further by adjusting one or more upstream power limitations of the thermal system for the thermal management of the device, based on the one or more characteristics of the flow of the coolant of the thermal system, via instructions provided by the processor.

14. The control system of claim 9, wherein the processor is further configured to at least facilitate adjusting the control of the thermal system for the thermal management of the device in a manner that remediates the loss of fluid flow further by selectively implementing an emergency cooling system based on the one or more characteristics of the flow of the coolant of the thermal system, via instructions provided by the processor.

15. The control system of claim 9, wherein the processor is further configured to at least facilitate adjusting the control of the thermal system for the thermal management of the device in a manner that remediates the loss of fluid flow further by selectively alternating between separate flow versus combined flow of a plurality of loops for the flow of the coolant of the thermal system, based on the one or more characteristics of the flow of the coolant of the thermal system, via instructions provided by the processor.

16. A vehicle comprising:
a body;
a drive system configured to propel the body;
a device comprising a computer;
a thermal system comprising a climate control system, the thermal system coupled to and configured to provide thermal management for the device; and
a control system coupled to the thermal system and configured for controlling the thermal management of the device via the thermal system, the control system comprising:
 a flow sensor configured to obtain flow data as to a flow of coolant of the thermal system; and
 a processor that is coupled to the flow sensor and that is configured to at least facilitate:
  determining one or more characteristics of the flow of the coolant of the thermal system, including by determining a loss of fluid flow of the coolant of the thermal system and determining an aeration of the coolant of the thermal system, based on the flow data; and
  adjusting control of the thermal system for the thermal management of the device in a manner that remediates the loss of fluid flow and the aeration of the coolant, based on the one or more characteristics of the flow of the coolant of the thermal system, via instructions provided by the processor.

\* \* \* \* \*